(12) United States Patent
Salimi et al.

(10) Patent No.: US 12,275,205 B2
(45) Date of Patent: Apr. 15, 2025

(54) RETRACTABLE MOLD BUILT-IN PRECISION PINS TO LOCATE COMPONENTS DURING LAYUP PROCESS FOR FABRICATION OF WIND TURBINE BLADES

(71) Applicant: TPI Technology Inc., Scottsdale, AZ (US)

(72) Inventors: Amir Salimi, Providence, RI (US); Bernie Dayalkumar, Portsmouth, RI (US); Alexander Segala, Rehoboth, MA (US)

(73) Assignee: TPI Technology Inc., Scottsdale, AZ (US)

( * ) Notice: Subject to any disclaimer, the term of this patent is extended or adjusted under 35 U.S.C. 154(b) by 0 days.

(21) Appl. No.: 18/215,473

(22) Filed: Jun. 28, 2023

(65) Prior Publication Data
US 2023/0415434 A1 Dec. 28, 2023

Related U.S. Application Data

(60) Provisional application No. 63/356,132, filed on Jun. 28, 2022.

(51) Int. Cl.
| | |
|---|---|
| *B29C 33/14* | (2006.01) |
| *B29C 70/54* | (2006.01) |
| *B29L 31/08* | (2006.01) |

(52) U.S. Cl.
CPC .... *B29C 70/545* (2013.01); *B29C 2793/0045* (2013.01); *B29L 2031/085* (2013.01)

(58) Field of Classification Search
CPC ............ B29C 33/14; B29C 2793/0045; B29C 70/545; B29C 70/543
See application file for complete search history.

(56) References Cited

U.S. PATENT DOCUMENTS

| | | | | |
|---|---|---|---|---|
| 1,806,887 | A | * 5/1931 | Bruno | .................... A41H 15/00 |
| | | | | 269/54.5 |
| 3,664,408 | A | * 5/1972 | Eibe | .......................... B22C 7/04 |
| | | | | 164/241 |
| 3,704,194 | A | * 11/1972 | Harrier | ................. B29C 70/545 |
| | | | | 156/303.1 |
| 4,958,676 | A | 9/1990 | Kuntz | |

(Continued)

OTHER PUBLICATIONS

Invitation to Pay Additional Fees for International Application No. PCT/US2023/026437 dated Sep. 5, 2023.

(Continued)

*Primary Examiner* — Matthew J Daniels
(74) *Attorney, Agent, or Firm* — Stephen J. Kenny; Foley Hoag LLP

(57) ABSTRACT

A wind turbine blade mold including a first mold surface, at least one aperture located within the first mold surface, the at least one aperture configured to receive at least one pin, the least one pin having a first end and a second end defining a length extending therebetween, the second end of the pin disposed within a pin driver, the pin driver disposed on a second mold surface, the pin driver configured to displace the at least one pin from a retracted position wherein the first end of the at least one pin is disposed below the first mold surface, to an extended position wherein the first end of the at least one pin is disposed above the first mold surface.

11 Claims, 18 Drawing Sheets

(56) References Cited

U.S. PATENT DOCUMENTS

| | | | | |
|---|---|---|---|---|
| 5,513,972 | A * | 5/1996 | Schroeder | B29C 33/302 |
| | | | | 249/161 |
| 6,346,209 | B1 * | 2/2002 | Messemer | B29C 45/4005 |
| | | | | 264/334 |
| 2002/0135116 | A1 * | 9/2002 | Dugas | B25B 5/16 |
| | | | | 269/49 |
| 2004/0070130 | A1 * | 4/2004 | Pavlik | B25B 5/061 |
| | | | | 269/32 |
| 2007/0075472 | A1 * | 4/2007 | Sawdon | B25B 5/087 |
| | | | | 269/49 |
| 2008/0230973 | A1 * | 9/2008 | Miyazaki | B23Q 3/082 |
| | | | | 269/309 |
| 2008/0315478 | A1 * | 12/2008 | McIntosh | B25B 5/087 |
| | | | | 269/49 |
| 2011/0073237 | A1 | 3/2011 | Rajasingam | |
| 2014/0338815 | A1 | 11/2014 | Davis et al. | |
| 2015/0336242 | A1 * | 11/2015 | Zajac, Jr. | B25B 5/087 |
| | | | | 269/32 |
| 2018/0023939 | A1 * | 1/2018 | Hicks | B23P 19/10 |
| | | | | 33/645 |
| 2019/0291306 | A1 | 9/2019 | Hannan et al. | |
| 2020/0384708 | A1 * | 12/2020 | Salimi | B29C 70/86 |

OTHER PUBLICATIONS

International Search Report and Written Opinion for Application No. PCT/US23/26437 dated Nov. 8, 2023.

\* cited by examiner

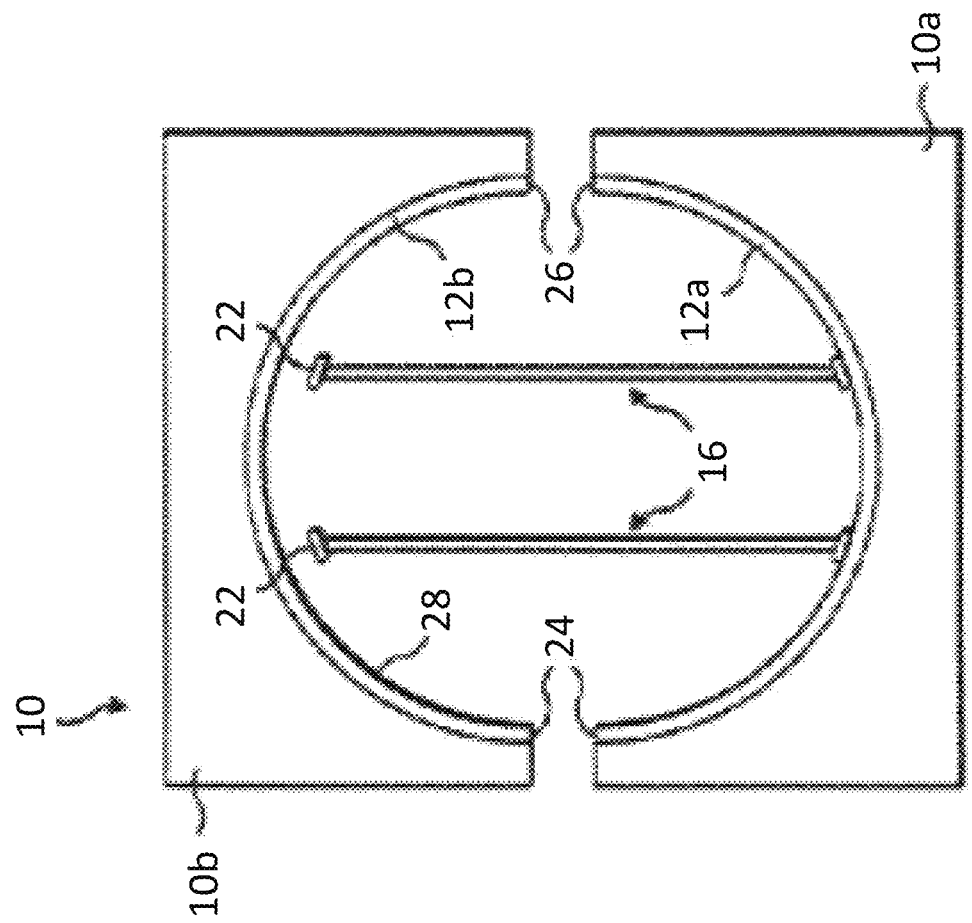

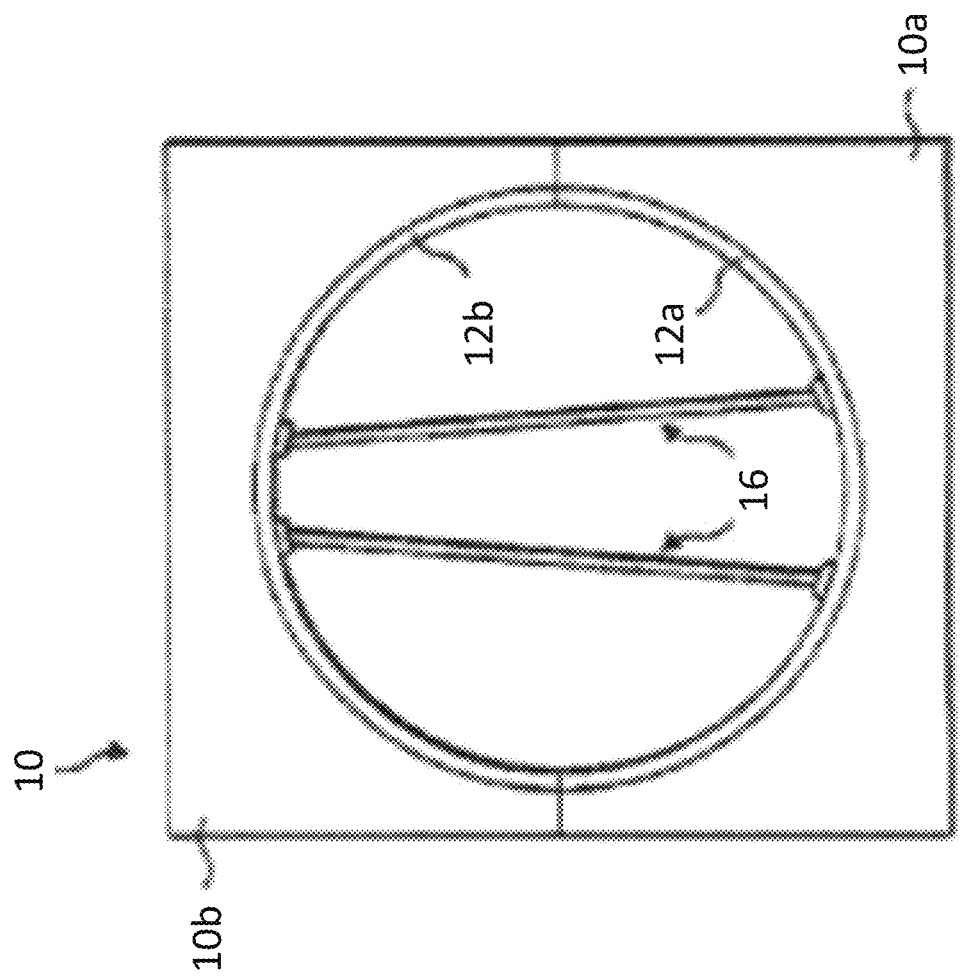

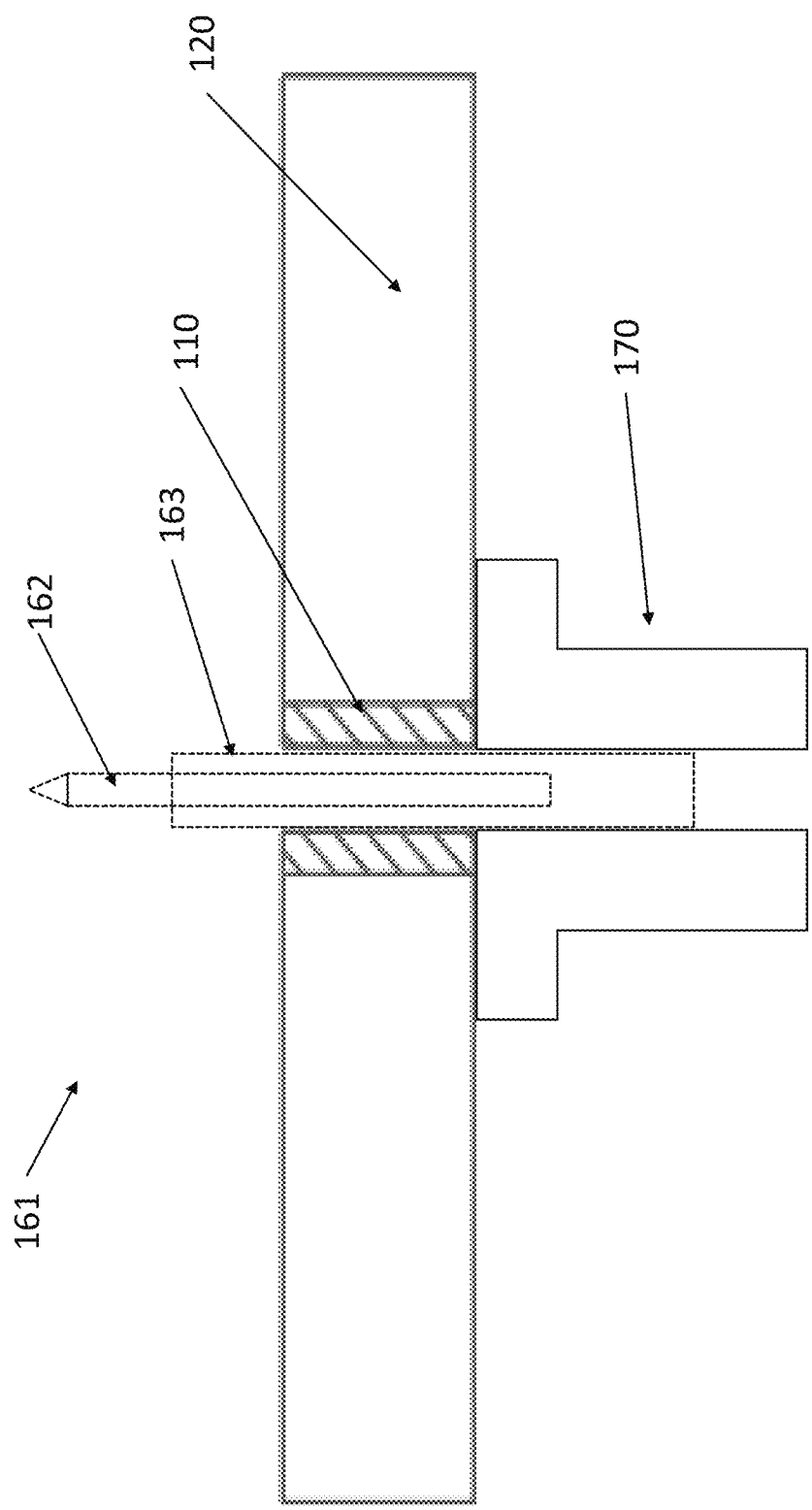

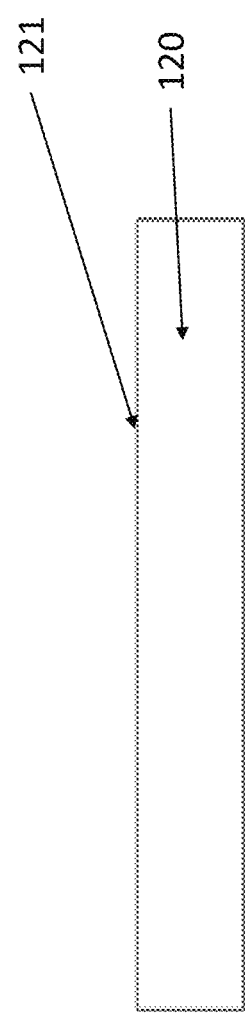
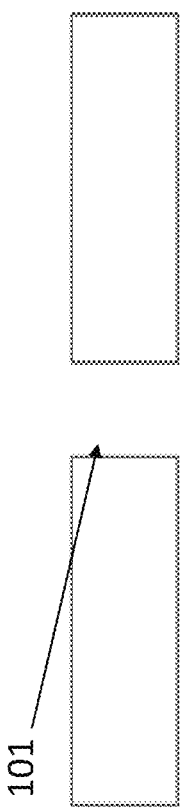
FIG. 4A
FIG. 4B

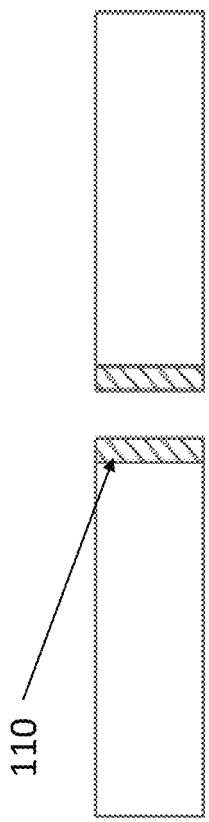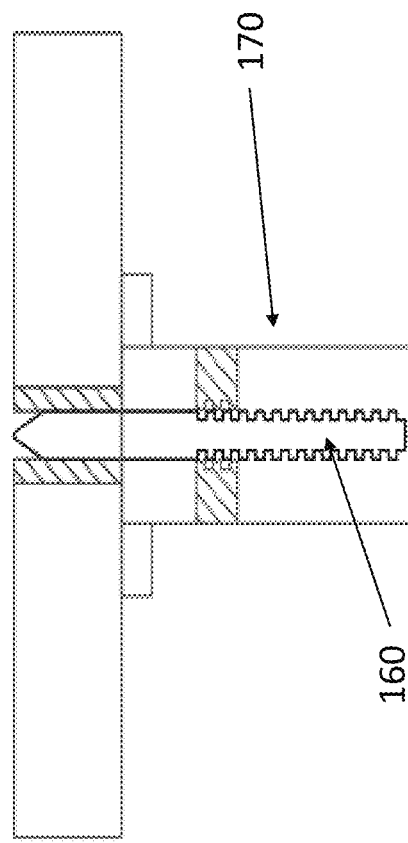

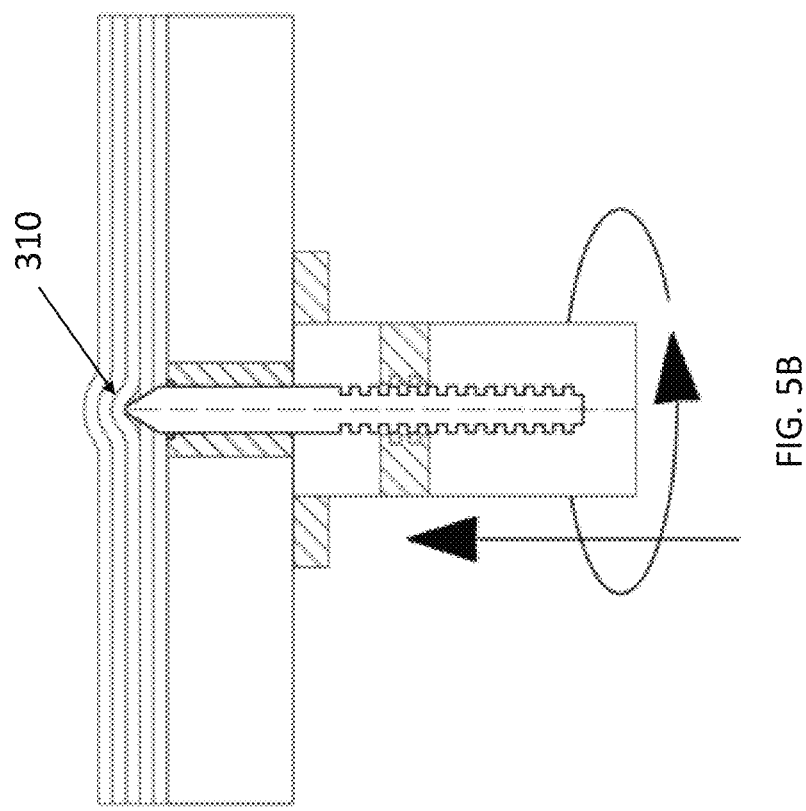

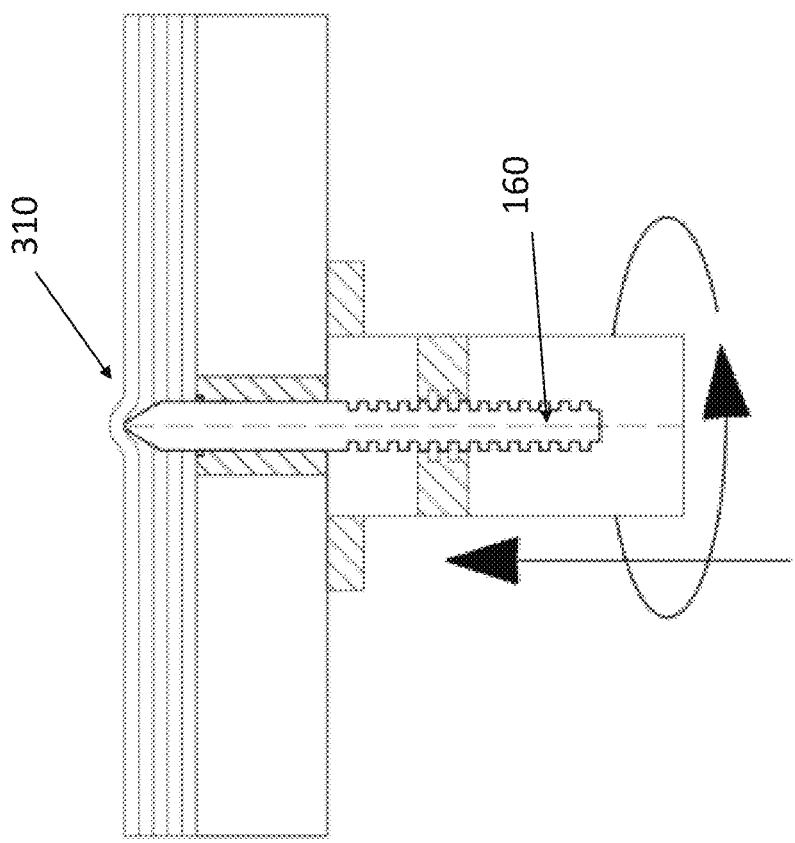

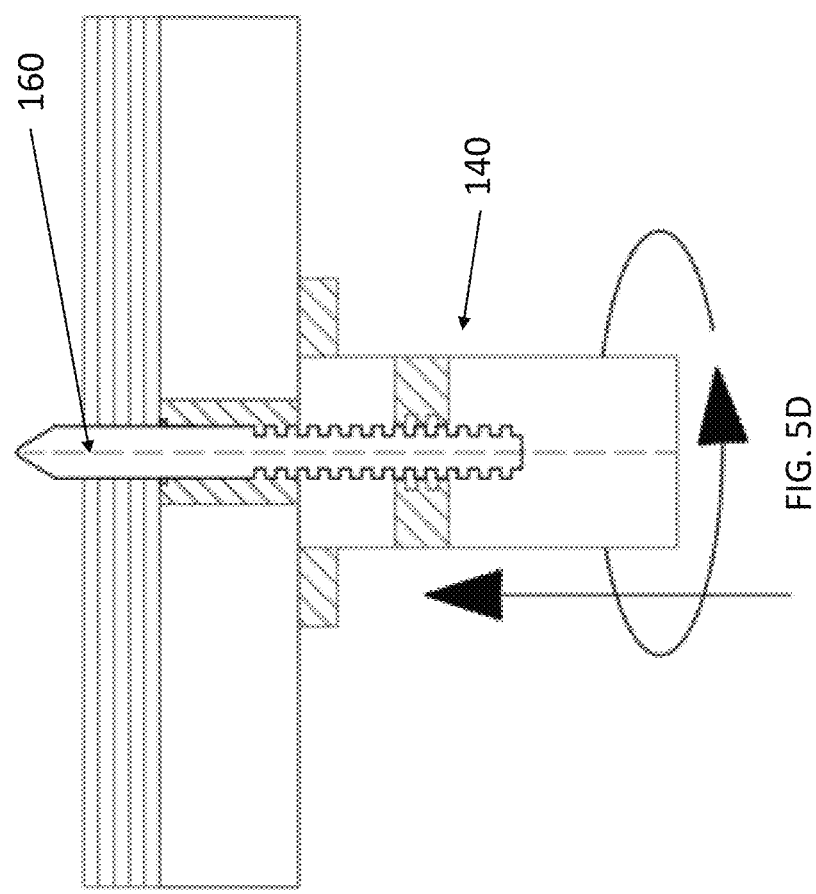

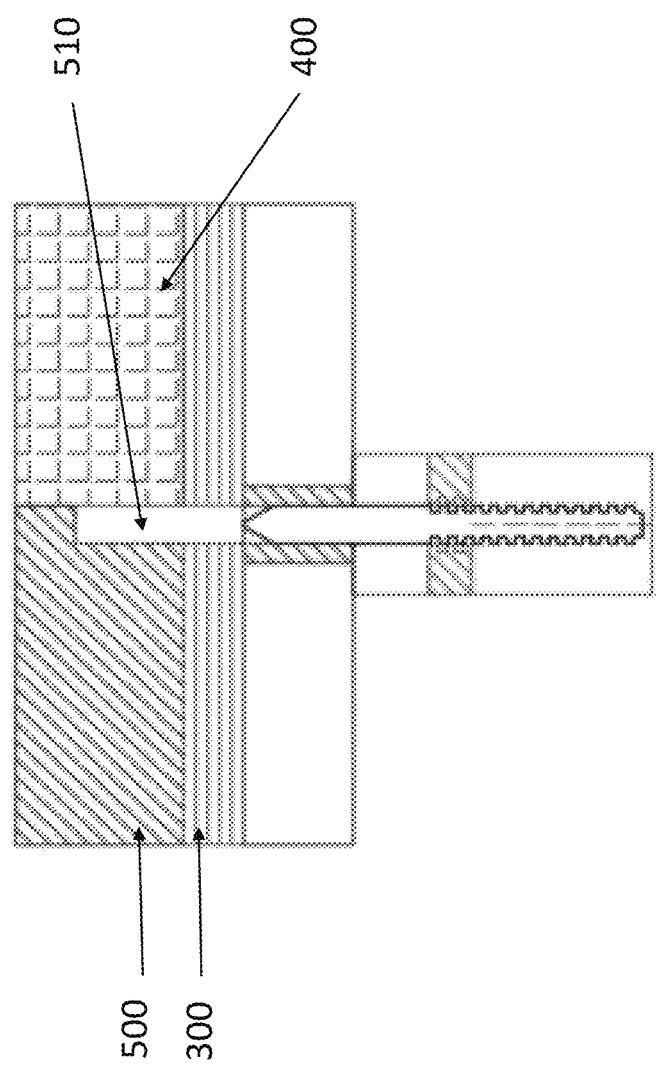

RETRACTABLE MOLD BUILT-IN PRECISION PINS TO LOCATE COMPONENTS DURING LAYUP PROCESS FOR FABRICATION OF WIND TURBINE BLADES

CROSS-REFERENCE TO RELATED APPLICATIONS

This application claims the benefit of priority to U.S. Provisional Patent Application No. 63/356,132 filed on Jun. 28, 2022, titled, "RETRACTABLE MOLD BUILT-IN PRECISION PINS TO LOCATE COMPONENTS DURING LAYUP PROCESS FOR FABRICATION OF WIND TURBINE BLADES," the entirety of which is hereby incorporated by reference herein.

BACKGROUND OF THE DISCLOSED SUBJECT MATTER

Field of the Disclosed Subject Matter

The disclosed subject matter relates to a system of manufacturing large-scale composite structures, e.g., wind turbine blades. These large-scale composite structures are typically formed from a two-piece mold that, once the blade halves are molded require a complex component location/installation, and subsequent mold closure process, to complete fabrication.

Accuracy of layup process in fabrication of wind turbine blades directly influences the quality of the final product. In the recent years, over-head optical projection and laser tracking systems have been vastly used as the conventional high precision locating and measurement tools to place components and reinforcement layers during layup process. However, there is a limit to the provided level of precision and repeatability due to calibration and projection errors.

Description of Related Art

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. An exemplary view of a mold half for a wind turbine blade is illustrated schematically in FIG. 1A-C.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear webs 16 are bonded to spar caps positioned on or within an inner surface 17 of the windward blade shell 12a. The shear webs 16 are longitudinally-extending structures that bridge the two half shells 12a, 12b of the blade and serve to transfer shear loads from the blade to the wind turbine hub in use. In the particular embodiment shown in cross-section in FIG. 1a, the shear webs 16 each comprise a web 18 having a lower edge 19 comprising, optionally, a first longitudinally-extending mounting flange 20 and an upper edge 21 comprising, optionally, a second longitudinally-extending mounting flange 22. Adhesive such as epoxy is applied along these mounting flanges 22 in order to bond the shear webs 16 to the respective spar caps of each half shell 12a, 12b.

As shown in FIG. 1B, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to spar caps along an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. Additionally or alternatively, the shear webs and spar caps can be inaccurately placed within the open mold halves prior to closing, resulting in a compromised or defective blade build. Furthermore, the concave curvature of the upper shell 12b also has a tendency to force the shear webs 16 together slightly, as shown in FIG. 1C. Such movement of the shear webs 16 during mold closing may result in the shear webs 16 being bonded to the spar caps and/or upper shell 12b at a sub-optimal position.

As blades are ever increasing in size in order to improve the operational efficiency of wind turbines, safety margins decrease thus requiring manufacturing acceptance criteria and tolerances to become stricter. This necessitates the design and implementation of manufacturing tools that enable high precision process checks to satisfy strict specifications and requirements.

There thus remains a need for an efficient and economic method and system for providing high precision placement and bonding of the internal components, e.g. spar caps, during the assembly phase of wind turbine devices that ensure proper placement of the components, without impacting the structure of the product.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes: a wind turbine blade mold including a first mold surface, at least one aperture located within the first mold surface, the at least one aperture configured to receive at least one pin, the least one pin having a first end and a second end defining a length extending therebetween, the second end of the pin disposed within a pin driver, the pin driver disposed on a second mold surface, the pin driver configured to displace the at least one pin from a retracted position wherein the first end of the at least one pin is disposed below the first mold surface, to an extended position wherein the first end of the at least one pin is disposed above the first mold surface.

In some embodiments, the pin driver displacement generates rotational movement of the at least one pin.

In some embodiments, pin driver displacement generates linear movement of the pin.

In some embodiments, the pin driver is displaced via rotational movement of a driver casing.

In some embodiments, the pin driver and the at least one pin are coupled via a threaded coupling.

In some embodiments, the mold further comprising a plurality of apertures disposed about and along a span of the first mold surface.

In some embodiments, the mold further comprising a bushing disposed within the at least one aperture, the bushing including a channel for receiving the at least one pin.

In some embodiments, the mold further comprising a sealing gasket disposed within the at least one aperture.

In some embodiments, the mold further comprising at least one layer of layup segments disposed on the first surface of the mold, with the second end of the at least a pin disposed above the at least one layup segment.

In some embodiments, the at least one pin pierces the at least one layer of layup segments.

In some embodiments, a portion of the at least one pin is configured to engage a structural component of a wind turbine blade.

In accordance with another aspect of the disclosure, a method of manufacturing a wind turbine blade includes providing a mold with a first mold surface, forming an aperture within the first mold surface, providing at least one pin having a first end and a second end, the pin aligned with the aperture and moveable between a retracted position having the first end positioned below the first mold surface, and an extended position having the first end of the at least one pin disposed above the first mold surface, and providing a bushing, the bushing disposed within the aperture, providing a gasket, the gasket disposed within the aperture and forming a seal with the at least one pin, providing a pin driver to actuate movement of the at least one pin between the retracted position and the extended position, and providing at least one layer of layup segments disposed on the first surface of the mold.

In some embodiments, the at least one pin driver actuation generates rotational movement and linear movement of the pin.

In some embodiments, wherein the at least one pin driver actuation forces the at least one pin to pierce the at least one layer of layup segments on the first surface of the mold.

In some embodiments, the at least one pin pierces the at least one layer of layup segment without forming wrinkles in the layup segments.

In some embodiments, the at least one pin driver actuation displaces the second end of the pin above the at least one layup segment.

In some embodiments, the method further includes performing a resin infusion process with the at least one pin in the extended position.

In some embodiments, a portion of the at least one pin is configured to engage at least one structural component of a wind turbine blade.

In some embodiments, the at least one pin is retracted to form a cavity between adjacent structural components.

In some embodiments, the at least one pin is removed from the wind turbine blade prior to a demold process.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 1A-1C depict cross-sectional views of a conventional wind turbine blade mold and manufacturing method.

FIG. 3B shows a telescoping pin mechanism in an extended state.

FIG. 4A-4D shows an exemplary installation of the pin mechanism.

FIG. 5A-5D shows an exemplary step-by-step extension of the pin system.

FIG. 7A-7C shows the final state of the pin mechanism where the pin is retracted post infusion.

Figure 1A:
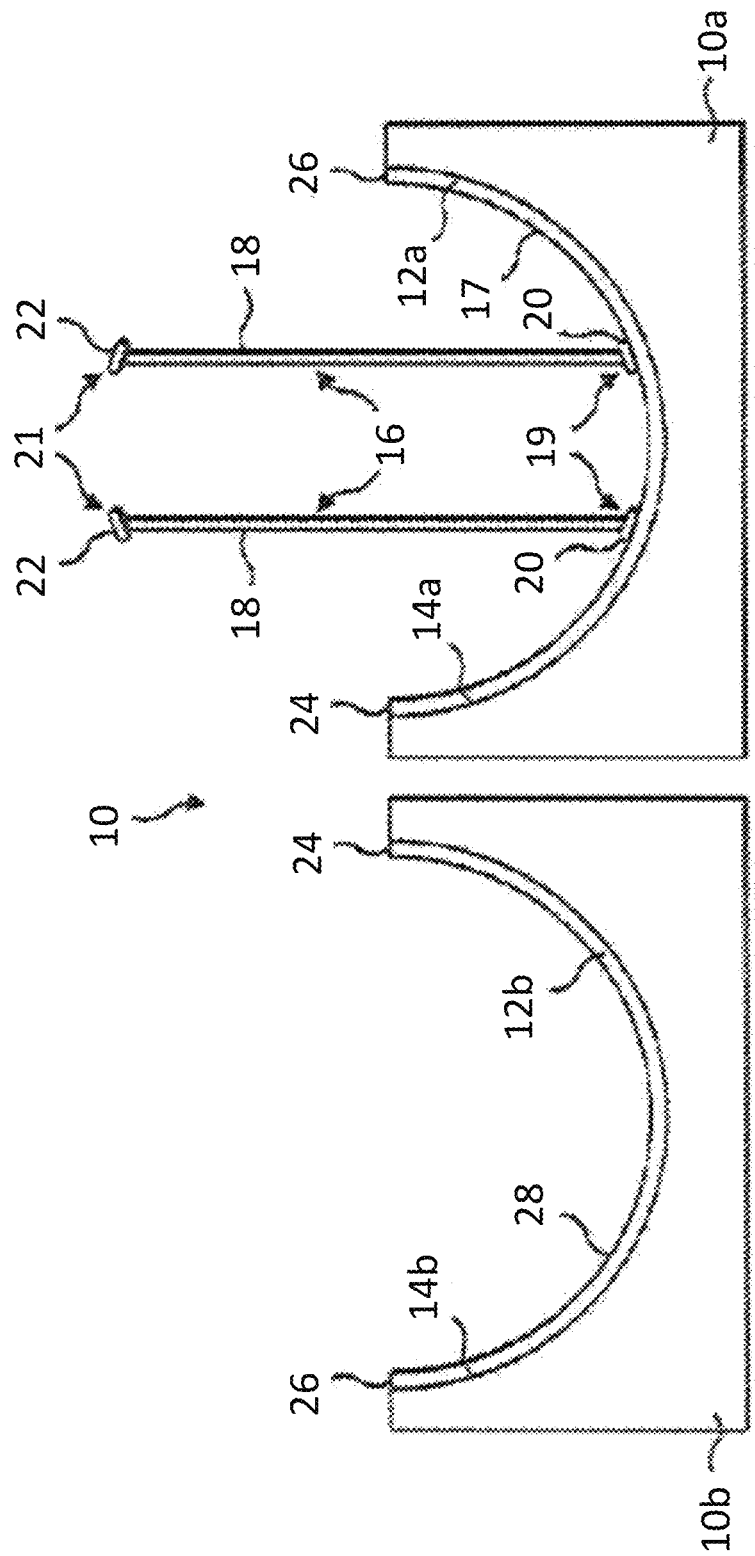

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION OF AN EXEMPLARY EMBODIMENT(S)

Reference will now be made in detail to exemplary embodiments of the disclosed subject matter, an example of which is illustrated in the accompanying drawings. The method and corresponding steps of the disclosed subject matter will be described in conjunction with the detailed description of the system.

One of the methods to improve the accuracy of layup process in fabrication of wind turbine blades is to utilize mold built-in precision pins. Transferring the location of the critical components from the tooling plugs to the mold, this method provides the highest accuracy levels that one can reach for placement of layup components such as reinforcement fabrics, spar caps and core. In addition, physical pins serve as hard stops for components, preventing any potential movements of layup elements during infusion process.

Particularly, the present disclosure provides structural elements, e.g. elongated pins, having various features that facilitate both placement and assembly of other components, e.g. spar caps. In some embodiments, the present disclosure provides positioning elements, e.g. elongated pins. As any minor violation of positioning tolerances for spar caps not only compromises the structural integrity of the blade due to lowering the bending stiffness, but also exceeds the tolerance of bond gaps due to shifts in the core material. The present disclosure provides precise positioning of pins that are extendable and retractable. Physical pins serve as hard stops for components, preventing any potential movements of layup elements during infusion process.

The present design provides high precision pins built-in features for placement and gripping with no risks of blade damage during demold process. This system disclosed herein addresses the lack inaccuracy in conventional blade component placement, movement as well as risk of demolding (or blade removal post infusion) defects.

The methods and systems presented herein may be used for large structure construction. The disclosed subject matter is particularly suited for construction of wind turbine blades. For purpose of explanation and illustration, and not limitation, an exemplary embodiment of the system in accordance with the disclosed subject matter is shown in FIGS. 2-7C and is designated generally by reference character 1000. Similar reference numerals (differentiated by the leading numeral) may be provided among the various views and Figures presented herein to denote functionally corresponding, but not necessarily identical structures.

A blade may include one or more structural components configured to provide increased stiffness, buckling resistance and/or strength to the blade. For example, the blade may include a pair of longitudinally extending spar caps configured to be engaged against the opposing inner surfaces of the pressure and suction sides of the blade, respectively. Additionally, one or more shear webs may be disposed between the spar caps so as to form a beam-like configuration. The spar caps may generally be designed to control the bending stresses and/or other loads acting on the blade in a generally span wise direction (a direction parallel to the span of the blade) during operation of a wind turbine. Similarly, the spar caps may also be designed to withstand the span wise compression occurring during operation of the wind turbine.

The spar caps of the present disclosure can be constructed of a plurality of pultruded members grouped together to form a first portion of the spar caps. In certain embodiments, the pultruded members may be formed by impregnating a plurality of fibers (e.g. glass or carbon fibers) with a resin and curing the impregnated fibers. The fibers may be impregnated with the resin using any suitable means known in the art. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members separate into one or more pultruded member bundles as the spar cap approaches the blade root so as to form a second portion of the spar cap.

More specifically, the spar cap is constructed of a plurality of pultruded members grouped together to form one or more layers. Thus, the layers may be stacked atop one another and joined together using any suitable means, for example, by vacuum infusing the members together or by bonding the members together via an adhesive, a semi-preg material, a pre-preg material, or similar.

The methods and systems described herein facilitate high precision component placement, e.g. spar caps, during molding processes. Particularly, the present disclosure introduces a novel apparatus and method which provides a blade mold with retractable/extendable pins, which provide accurate geometric references throughout the blade span, and in some embodiments, can be used as a mechanical stop for components that require a rigid support surface. In some embodiments, the present disclosure can include over-head optical projection and laser tracking systems to assist in locating and measurement tools to place components and reinforcement layers during layup process.

Figure 2:
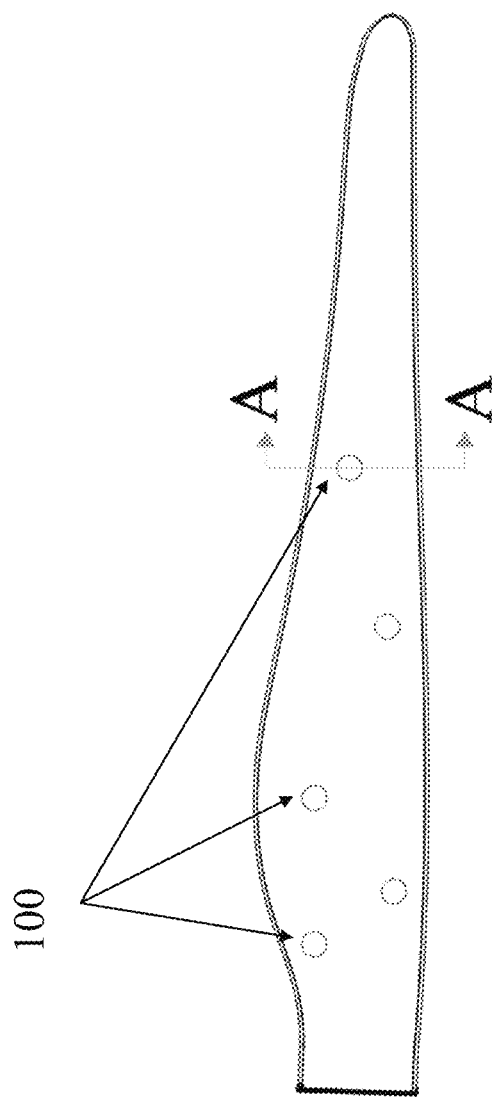
FIG. 2 is a schematic top view of a mold half with exemplary pin locations in accordance with an embodiment of the present disclosure.

Referring now to FIG. 2, a top view of a blade mold half with a plurality of pin location features or pins distributed along the span of the blade half. This depiction does not seek to limit the arrangement of pin locations along the blade mold half, for example a bottom view of a blade mold half, with a plurality of pin locating features or "pins" as described below distributed along the blade span may be shown. The pin locations 100 can include a hole (extending partially, or completely, through the mold surface) and will be referred to as "pin holes" throughout for convenience. The location(s) of the pin holes 100 may be specified in the 3D manufacturing model of the blade mold. In various embodiments, the pin holes 100 may be dimensionally oriented and located within one or more 3D manufacturing models associated with the blade mold or blade mold half. In various embodiments, a separate model or orientation and dimensional coordinates of the pin holes may be associated with a model of the blade mold half. In various embodiments, one or more paper or mylar engineering or manufacturing drawings associated with the blade mold half may be further defined with pin hole models as described herein.

In order to fabricate the mold, blade mold half, or the like (which will be employed to fabricate wind turbine blades), a male "plug" is first formed to serve as the structure which imparts the specified geometry into the mold or blade mold half. During plug build, precision pin holes 100 are formed. In various embodiments, the pin holes 100 may be machined or subtractively manufactured by the plug, such as a CNC machine or the like. For example and without limitation, a plug may be machine using one or more computer-controlled tool or manual tool, such as a drill press and the like. In various embodiments, the pin holes 100 may be machined into the plug surface. In various embodiments, a plug may be manually or automatedly rotated or adjusted in the tool or CNC machine to form the pin holes 100. The pin holes 100 are thereafter transferred to the final mold and can serve as reference point(s) to calibrate and verify proper positioning of any overhead laser projection or Faro measurement system. While a plurality of pin holes 100 are permanently formed in the mold, select pin holes can be plugged or occluded if not employed for receiving a pin, as described in more detail below.

In accordance with an aspect of the present disclosure, the blade mold is formed with built-in precision pins. This improves the accuracy of layup process in fabrication of wind turbine blades by transferring the location of the critical components (e.g. spar caps, shear webs, reinforcement fabrics, core, etc.) from the tooling plugs to the mold itself, which provides the highest accuracy levels that one can reach for placement of layup components. In addition, physical pins can serve as hard stops for components, preventing any potential movements of layup elements during infusion process and/or thermal cycling of the mold.

The number and location of the pin holes (100) can vary depending on blade design specifications. For example and without limitation, the pin holes 100 may be altered or employed based on spar cap number and location, size of the spar cap or internal bracing or the like. As shown in FIG. 2, the distribution of pin holes (100) need not be uniform but instead concentrated in select areas of the blade. The number, distribution and geometry of the pin hole(s) can vary along the blade span, e.g., there can be a greater concentration of pin holes (100) at locations with large/heavy internal components and/or more complex geometry or surface contours, e.g., with a greater number of pin holes (100) located proximate the root as compared to the tip of the blade. Additional examples of pin/hole/mold geometries can be found in U.S. Pat. No. 11,613,087 and U.S. patent application Ser. No. 17/590,451 both of which are hereby incorporated by reference in their entirety.

Figure 3A:
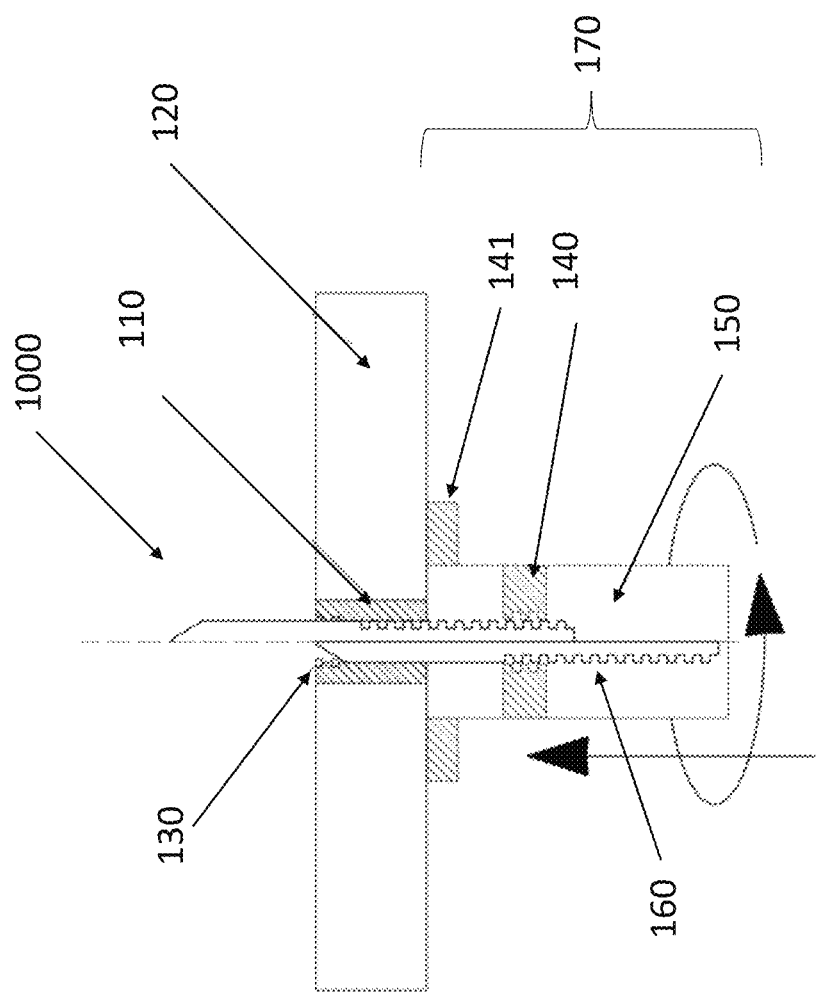
FIG. 3A shows the pin mechanism in both the retracted and extended states.

FIG. 3A depicts a pin mechanism 1000 of a pin 160, for sake of clarity shown, simultaneously, in both the retracted, and extended states (relative the blade mold), separated by a broken line. The bushing 110 is positioned within the inner diameter of the pin hole, and thus surrounded by a mold 120, which may be a blade mold half or another mold. As shown, the bushing 110 can be formed with a thickness (shown as a vertical height in the orientation in FIG. 3A) that is equivalent to the thickness of the mold—at that location where the pin hole is located (i.e. the mold thickness can vary along blade length, and the bushing is correspondingly sized to match the thickness). Accordingly, the bushing 110 can be sized so that its top and bottom surfaces are coplanar, or flush, with the top (i.e. interior) and bottom (i.e. exterior) surfaces of the mold 120 such that the bushing does not extend above the top (i.e. interior) surface of the mold to obstruct or interfere with placement of any fiber layup segments. In various embodiments, the busing 110 can be sized such that the ends of the bushing are coextensive and flush with the contours of the mold 120 at the bushing location. For example and without limitation, the ends of the bushing 110 may include complex contours that match the surrounding interior/exterior surface of the mold 120. In various embodiments, bushing 110 may sit within the mold 120 such that the ends of the bushing sit within the mold 120. In various embodiments, bushing 120 may have internal or external geometric features that operate to seal the gap between the bushing 110 and the mold 120. In various embodiments, the ends of the bushing 110 may extend past the surfaces of mold 120 such that the busing 110 is exposed in the mold 120 surfaces. In various embodiments, the bushing 110 may include contours that form part of the mold 120 surface.

In the exemplary embodiment shown, the pin 160 is configured with an angled distal end or faceted-edge to create a piercing tip, however other tip configurations can be employed (e.g., curvilinear surfaces which can have concave and/or convex portions to facilitate piercing of the layup segments without creating distortions or wrinkles, as described in further detail below). For example and without limitation, pin 160 may include a multiple pin assembly 161 as shown in FIG. 3B. FIG. 3B depicts multiple pin assembly 161 in section view, showing the first and second pins in phantom lines. This depiction does not seek to limit the cross-sectional shape, actuation mechanism, material or other aspects of the multiple pin assembly 161. Multiple pin assembly 161 may include one or more pins of a plurality of diameters, piercing tip arrangements, if present at all, differing extension lengths, telescoping components, or the like. For example and without limitation, a first pin 162 may be disposed collinearly and coincident with a second pin 163 which wholly surrounds the first pin 162. The second pin 163 may extend and pierce or partially pierce the layup to start a hole, opening, slit or slot. The first (e.g., circumscribing) pin 162 may then extend a distance that finishes the piercing process. The first pin 162 and second pin 163 may be telescoping relative to each other such that they may pass each other in the same direction. The first pin 162 and the second pin 163 may be collinear and non-coincident such that a first pin 162 may extend a first distance and start a hole in the layup and the second pin 163 may extend from a different position a second distance and finish the hole in the layup, according to embodiments. The first pin 162 may include a lesser diameter than the second pin 163, according to embodiments. The first pin 162 may include a harder material than the second pin 163, according to embodiments. For example and without limitation, pin 160 may include a multiple-stage extension mechanism. Pin 160 may extend a first distance to pierce the layup initially then retract, then extend a second distance which is greater than the first distance to finish the hole in the layup. This multiple-stage extension mechanism may be repeated as necessary or a predetermined amount of stages, such as extending in 3, 4, 5, 10 or 100 stages.

A seal gasket 130 can also be provided in the pin mechanism 1000. This seal gasket allows for a fluid-tight seal to prevent leakage (e.g. resin flow) into the pin mechanism 1000 during the VAR™ process. The seal 130 is sized to fit the inner diameter of the bushing 110. In some embodiments the seal 130 is formed from an elastomer (rubber) to restrict resin flow downward into the pin mechanism, but permits the actuation of the pin 160 between retracted and extended positions. In various embodiments, seal gasket 130 may be configured to sit within bushing 110. In various embodiments, seal gasket 130 may be configured to sit flush with the end of the bushing 110 coplanar and contoured with the surfaces of mold 120. In various embodiments, seal gasket 130 may be formed from a rubber configured to withstand temperatures and pressures associated with the VAR™ process. In various embodiments, seal gasket 130 may be configured to sit within a corresponding recess in bushing 110, mold 120 or a combination thereof.

The driver 140 is provided for actuating the pin 160 between retracted and extended positions. Driver 140 may be configured to actuate the pin 160 to any position between a fully retracted and fully extended position, including extending in a direction substantially opposite from the extended position shown in FIG. 3A. In the exemplary embodiments shown, the driver 160 includes a threaded coupling with the distal end of the pin 160 which, upon rotation of the driver 160, the pin 160 is proportionally extended/retracted (e.g. moves up/down as shown). In various embodiments, the pin 160 may include ridges or ribs or threads that matingly couple with the ridges, threads or ribs on the driver 140 such that rotational motion of the driver 140 exerts a longitudinal force on the pin 160 such that the rotation of the driver presses upwardly or downwardly on the pin 160 to translate. Additionally or alternatively, the driver 140 can be configured as a fluidic-driven piston, magnetic/solenoid driven pin, or even piezo-electric member that operates to extend and/or retract the pin 160 upon an input command. In various embodiments, the input command may be an analog signal, which commands actuation in extension or retraction, depending on the current state of the pin 160. In various embodiments, the input command may be a digital signal configured to both command the extension or retraction of the pin 160 but also a distance the pin 160 extends or retracts. In various embodiments, the input command may command the pin 160 to extend or retract a number of instances or with a differing amount of force over time. In various embodiments, the command may include a first (162) or second pin (163) telescoping therewith a predetermined amount of times. In various embodiments, the pin 160 may be commanded to extend or retract a distance based on the types of layup fibers present on the mold 120. The driver 140 is surrounded by a driver casing 150 and can be powered via electrical, hydraulic and or pneumatic systems and feed lines that are positioned outside of the blade mold.

The driver 140 and driver casing 150 together form a driver system 170. The driver system can include a support ring 141 attached to the bottom (i.e., exterior) surface of the mold and circumscribes the driver 140 to align the pin 160 for insertion through the pin hole in the mold surface. Support ring 141 may partially be seated in the pin hole by one or more bushings or boss protruding from support ring 141 into the pin hole. Support ring 141 may align driver 140 and pin 160 there coupled collinearly and concentrically with the pin hole. Alignment ring 141 may include one or more features such as protrusions, bosses, or pegs that correspond to one or more hollows, holes, slots, or other mating features on mold 120 to align the driver 140 and in turn, pin 160. In various embodiments, the alignment ring 141 may include one or more adjustment features configured to further tilt or linearly translate the driver 140 and pin 160. For example and without limitation, the alignment ring 141 can adjustably translate portions of driver 140 toward or away from mold 120 in order to tilt or move driver 140. Accordingly, in the exemplary embodiment shown, all components of the driver system 170 are positioned outside or exterior to the inner mold surface (with the pin 160 able to be inserted through the mold, into the interior of the mold to a desired depth/height, as described in further detail below). In various embodiments, the driver system 170 may be located within the mold 120. In various embodiments, driver system 170 may be located adjustably within the mold 120. For example and without limitation, driver system 170 may be used to select a pin location along the span of mold 120.

The installation of the pin mechanism 1000 is depicted in FIG. 4A-4D. FIG. 4A specifically shows a tooling surface 121 of the mold 120. In various embodiments, the tooling surface 121 may be an interior surface of the mold (when in the closed configuration) which is configured to receive the layers of composite layup segments to be molded to form a blade skin within the mold 120. An aperture 101 is formed in the tooling surface 121 and through the thickness of mold 120, of a sufficient size to receive and retain the bushings 110, which is depicted in FIGS. 4B-4D. The aperture 101 can be formed in a variety of techniques including drilling, punching milling, etc. According to embodiments, one or more seal assemblies may be included to protect aperture 101 from burrs, snags, chips, unfinished edges, or other obstructions from forming and putting layups at risk of snags and tears. In the exemplary embodiment shown, hole 110 passes through the entire thickness of the mold 120. FIG. 4C depicts the bushing 110 installed within the aperture 101, such that no portion of the bushing 110 extends beyond the tooling surface 121 of the mold 120. The bushing 110 includes an aperture or channel for slidably receiving the pin 160, while engaging the outer surface of the pin to create a fluid tight seal to prevent resin egress, as described above. Finally, FIG. 4D depicts the entire pin mechanism installed underneath the tooling surface 101 of the mold 120. The pin 160 is in the middle of the mechanism, shown in an intermediate position (i.e. retracted below the interior surface of the mold 120) and the driver system 170 is surrounding the pin 160.

Figure 5A:
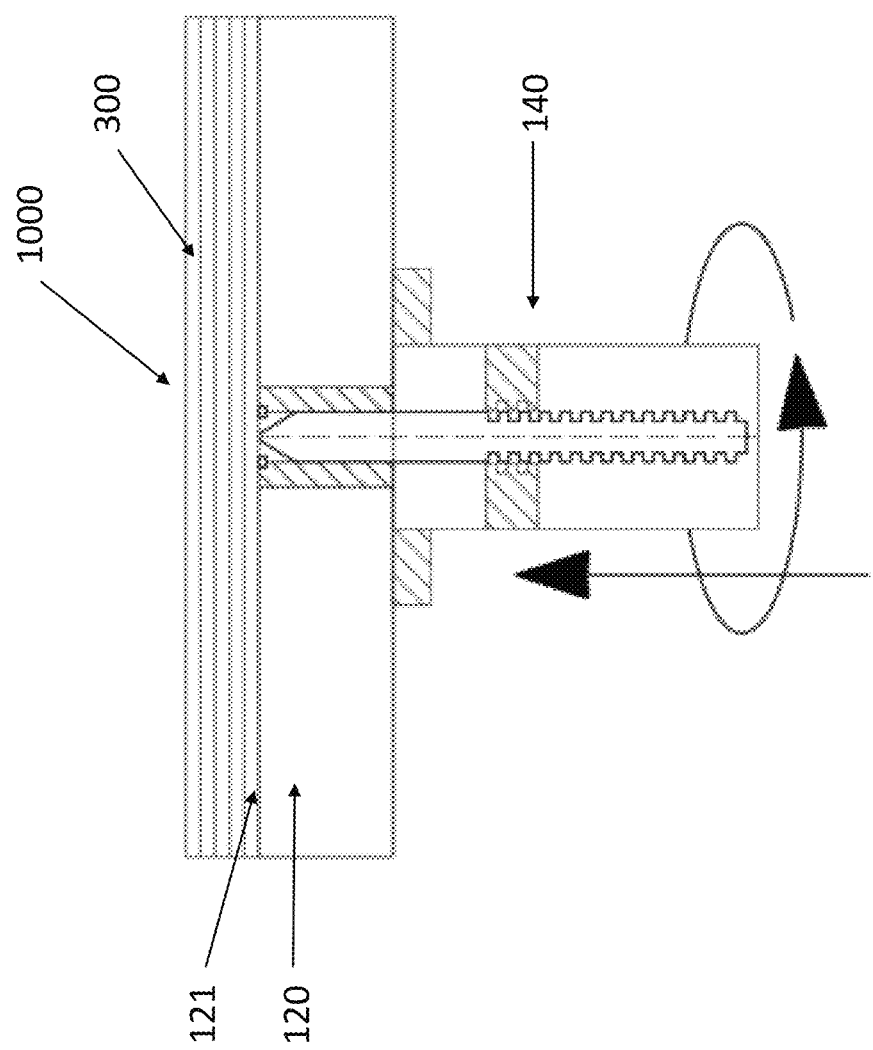

Referring now to FIGS. 5A-5D, a depiction of a step-by-step extension of the pin mechanism 1000 system is presented. In FIG. 5A, the reinforcement layer(s) 300 of composite material (also referred to as layup segments) are deposited on top of the tooling surface 121 which has an aperture formed therein with a driver 140 and a pin 160 extending within the aperture from an exterior surface of the mold, pointing towards the interior of the mold 120. The pin driver 140 actuates to drive the pin 160, upwardly as shown in FIGS. 5A-D, into the interior of the mold, and downwardly to retract the pin outside of the mold and below the interior surface 121 of the mold. In the exemplary embodiment shown, driver 140 employs a mechanical actuator which rotates normally to the longitudinal axis of the pin to generate translational movement (e.g., up and down or in and out of the reinforcement layer 300) of the pin 160. In some embodiments, the insertion/retraction depths, and/or speed of movement, of the pin 160 can be programmed and operated via an automatic system and include an alert (visual and/or audible) to alert an operator once the predetermined position is reached. Similarly, an alarm can be triggered if a threshold position/speed of the pin is approached or exceeded. In various embodiments, pin 160 may include one or more colored dyes or other visual indicators to show an operator or computer that the operation is successfully completed.

In accordance with an aspect of the present disclosure, there are no wrinkles in (any of) the layer(s) 300 during advancement/retraction of the pins 160 (thus the final assembly of all composite layers remains wrinkle free). This is achieved by the combined linear (e.g. up/down) and torsional motion of pin 160 (as indicated by the arrows depicted in the figures) which maximizes the piercing force of the pin through the fabric reinforcement layup layer(s) 300 without creating any jamming, wrinkles or waves in the composite fabric layers. The rotational motion of the driver 140 may be transmitted to the pin 160 such that the pin translates and rotates simultaneously. In various embodiments, the pin 160 may be isolated from the rotational motion of the driver 140, such that the rotational motion of the driver 140 does not rotate the pin 160 and only imparts translational (e.g. vertical) motion to the pin 160. In various embodiments, the rotational motion of the pin 160 may operate to reduce bunching, wrinkling or tearing of the reinforcement layers 300 during the piercing process. In some embodiments, if formation of a wrinkle in a composite layer is detected, the rotational motion of pin 160 can be reversed to remove, or "undo", the wrinkle.

Additionally, the system disclosed herein pierces the layers of layup segments beginning with the layer abutting the mold surface, and continuing upward through the top layer (with respect to the mold; which becomes the inner most layer of the wind turbine blade once the two mold halves are closed in the clamshell manner described above). This approach or order of operation is advantageous as the weight of the layers of layup segments (300) serve as an anvil or anchor against the upward force generated by the advancing/piercing pin 160. In other words, piercing the composite layup layer 300 closest to the mold surface 121 first utilizes the weight/resistance of the aggregate/upper layers of layup segments to create a local tension at the piercing location—thereby inhibiting/prohibiting the formation of wrinkles in the layup segments (which can jeopardize the structural integrity of the blade, particularly in this layer closest the mold surface, which becomes the outer skin surface of the blade upon mold closure).

In various embodiments, the tip of the pin 160 may be adjustable or configurable based on the material type/number/thickness/etc. of reinforcement layers 300. In various embodiments, for a larger amount of layers, a sharper piercing tip of the pin 160 may be employed. In various embodiments, an initial pin 160 (such as first pin 162) with a round or flat head may initially extended into the reinforcement layers 300 wherein a secondary pin (such as second pin 163) telescopingly affixed thereto may then pierce the layers with a sharp tip. FIG. 5A depicts the pin in the initial, retracted position where the distal tip of the pin is located below the interior surface 121 of the mold, or spaced from the layup segments 300 deposited on the interior surface of the mold 120.

As the driver 140 rotates, the pin 160 is rotated, and translated upward to extend the pin 160 out of the bushing 110, past the gasket 130, and into the interior of the mold, which causes the distal end of the pin to engage, and pierce through, the layers of fiber layup segments. In the snapshot shown in FIG. 5B, the pin 160 has penetrated through the first two layers of layup segments 300, with the top three layers of layup segments not yet pierced by the pin 160. Further actuation (e.g. rotation) of the driver 140 continues the advancement of pin 160 such that pin 160 engages and pierces the next two layers of layup segments 300, with only the upper most layer not yet engaged by the pin 160, as shown in FIG. 5C. The pin 160 continues to advance upward to its final position, shown in FIG. 5D, where the distal end of the pin 160 has pierced through all layers of the layup segments 300.

In some embodiments, a sensor can be incorporated into the distal end of the pin 160 to detect when all layers of the layup segments 300 have been pierced/passed through, and alert an operator and/or terminate operation of the driver 400. In various embodiments, pin 160 may include an optical sensor configured to detect the presence of light after which pin 160 pierces the layup segments 300. In various embodiments, pin 160 may include an optical sensor configured to detect a change in light intensity associated with the light penetrating successive layup segments 300. For example, the optical sensor may include an optical sensor that can detect light based on how many segments are penetrated or yet to be penetrated. For example, the intensity of light may be at a maximum after full penetration wherein the pin 160 exits the layup segments 300 in FIG. 5D. In various embodiments, the optical sensor may operate in any and all portions of the electromagnetic spectra. For example and without limitation, the optical sensor may be configured to detect light from one or more fluorescent lights. Additionally or alternatively, a light of a specific wavelength may be employed over the layup segments 300, the light emanating from which may be absorbed or partially absorbed by the optical sensor. For example and without limitation, an ultraviolet light or infrared light may be the operable wavelengths for this system.

In various embodiments, pin 160 may include an acoustic sensor configured to measure or detect the penetration depth of the pin within the layup segments 300. The acoustic sensor may be configured to detect an intensity of sound waves or other vibrations associated with the penetration depth or successful full penetration of the layup segments 300. In various embodiments, the acoustic sensor may be configured to detect the efficiency of the pin piercing the layup segments 300. For example, an acoustic signature may differ from a successful pierce to an unsuccessful pierce. The acoustic sensor may provide feedback to one or more users or computers regarding the penetration depth or successful penetration of the layup segments 300. For example and without limitation, acoustic sensor may notify a user of a single unsuccessful pierce at a particular pin hole 100 by pin 160.

In various embodiments, pin 160 may have a transducer or force sensor affixed thereto. In various embodiments, the force sensor may be configured to detect the presence of layup segments 300 pressing down on the tip of the pin 160. For example and without limitation, the force sensor may detect and transmit a signal when the force on head of the pin is reduced below a certain threshold or reduced to zero. For example and without limitation, the force sensor may be configured to measure a penetration depth based on the pressure applied by the remaining layup segments 300. For example, the greater the pressure on the pin 160, the more layup segments 300 remain on the pin 160. In various embodiments, the force sensor may be configured to compensate for the speed and force with which the pin 160 extends into layup segments 300.

In various embodiments, pin 160 may include a sensor suite having two or more sensors of similar or varying typologies, each configured to measure or detect a pierce level or wrinkle level of the layup segments 300. For example, each pin 160 may include an optical and an acoustic sensor working in tandem to measure the depth of pierce or pierce completion. In various embodiments, the sensor suite may have an optical, acoustic and force sensor or a subset thereof. In various embodiments, the sensor suite may have sensors of a type as described herein.

In some embodiments, the pin 160 can be configured as a cylindrical member with an arcuate exterior (or outer diameter). Additionally or alternatively, the pin 160 can be configured with linear sides (e.g. facets) for engaging structural members (e.g. spar caps) to provide a planar mating surface which serves as a stop to prevent movement of the structural members. Also, the pin 160 can be configured to capture any frangible portion of the layers of layup segments as the pin pierces/penetrates though the layers. For instance, the pin 160 can be hollow or include an internal chamber to collect each pierced layer of layup segments (300) upon insertion of the pin through these layers. This prevents any foreign object debris from interfering or compromising the manufacturing process. Additionally, the hole in the layup or portion thereof left by the one or more pins 160 are smaller in diameter than the acceptable foreign object criteria such that no foreign objects can enter the hole after or during the manufacturing process and compromise the one or more layups or portions thereof. Additionally, putty may be filled in the holes during or after the hole punching process automatedly or manually.

Figure 6A:
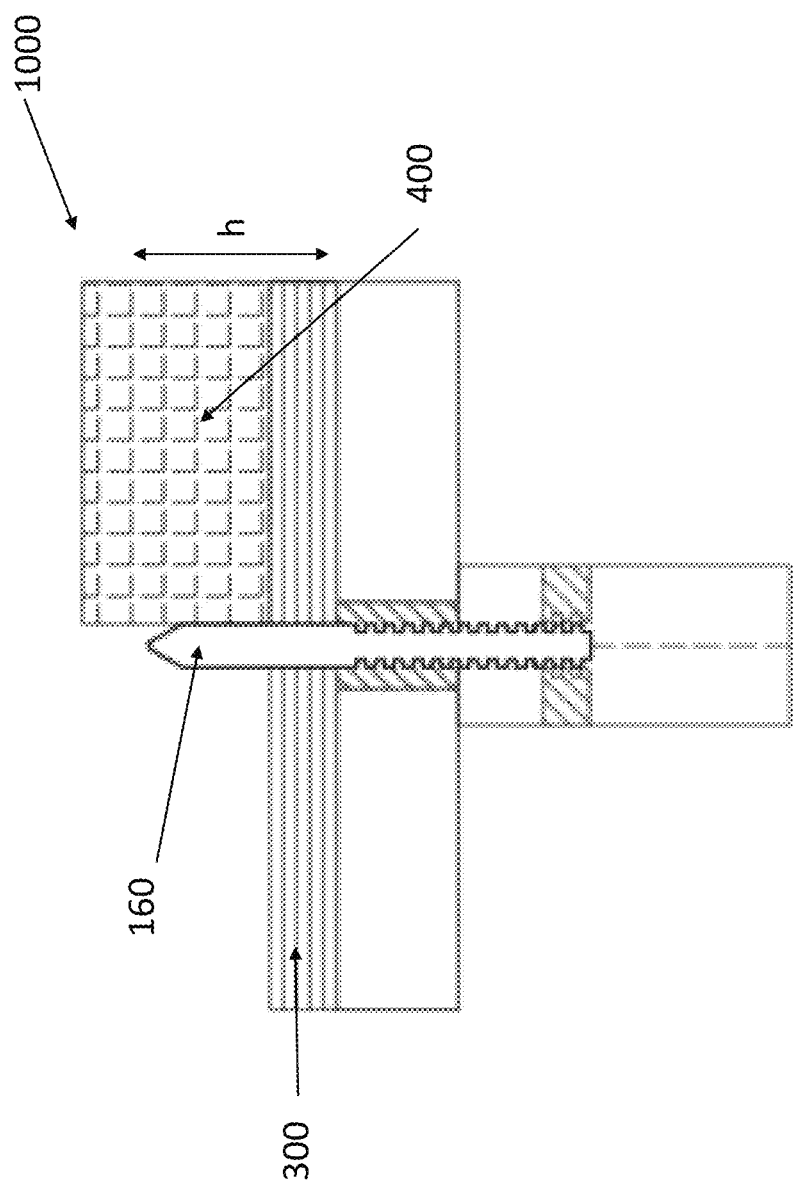
FIG. 6A-6C shows various heights of an exemplary pin extension, which can serve as a datum and/or structural support, in accordance with an aspect of the disclosure.
Figure 6B:
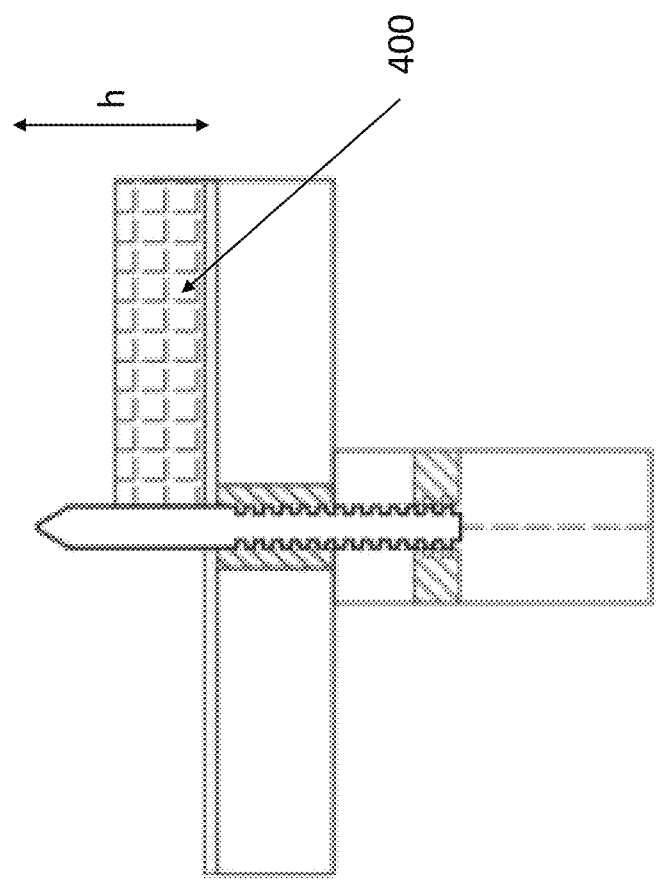
Figure 6C:
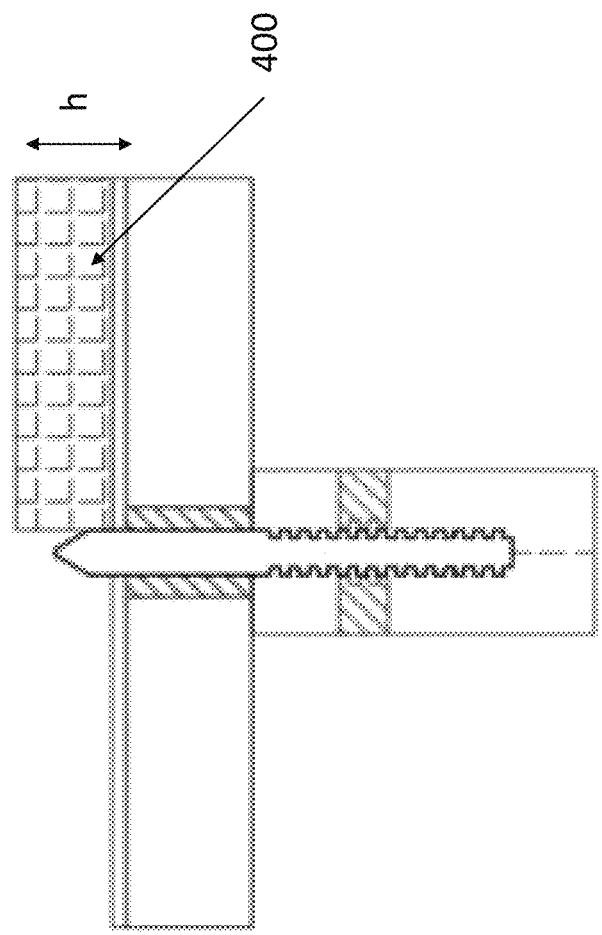

In accordance with another aspect of the disclosure, the linear extension/retraction motion of the pins 160 allows for using standardized (e.g. identical) units for all areas of the mold—even where various heights of the pin may be required as shown in FIGS. 6A-C. Thus the pin mechanism 100 of the present disclosure can be configured as a universal system that can be incorporated (and/or retrofitted) into any location within a given mold (e.g. root and tip can employ the same pin mechanism), and/or of any blade design/geometry.

FIG. 6A-6C depict that the various heights "h" that the pin 160 can extend above the mold surface 121, and/or above the layers of fiber layups 300. For example, in FIG. 6A, a plurality (e.g. five) fiber layup segments 300 are stacked on top of each other, and a structural component 400 (e.g. spar cap, core, etc.) is positioned on top of the segments 300. Here the pin 160 extends into the mold a distance, or height "h", that is less than combined height of the layups 300 and structural component 400, as shown. Conversely, in FIG. 6B the pin 160 is extended a distance into the mold such that the distal end of the pin 160 is disposed at a height (measured relative to the mold 120) greater than, or above, the combined height of the (single) layup segment and the structural component 400. The one or more heights in which pin 160 is extended in or through a portion of the one or more parts may be configured to accept a part such as a bracing member or be used as a hard stop for one or more mating parts. FIG. 6C depicts an embodiment in which the (single) layup segment 300 and the structural component 400 extend to a height greater than the height of pin 160. These internal structural components 400, 500 can rely on the placement pins as a point of reference, and in some embodiments as a load bearing member, to ensure the structural component 400, 500 is correctly positioned within the blade. For example, the structural component 400, 500 can be positioned to abut against the pin(s) 160 or one or more holes to prevent lateral displacement of the component 400, 500.

Upon completion of the layup process, the tips of the pins 160 remain visible over the composite glass layers 300. These reference marks of the pin heads serve as a visual basis for placement of spar cap. In some embodiments the pins can include markings to denote the height of the stack of layup segments 300 to provide a visual aid to an operator confirming that a predetermined number/height of layup segments has been installed, and/or serve as a basis of comparison of the status of layup segment at a given location of the blade with respect to another (e.g. root vs. tip).

Additionally, an overhead optical (e.g. laser) projection system can project the placement of the structural component (e.g. superimpose perimeter boundaries of the structural components) for verification or as a secondary means of proper positioning when consistent with the pin location 160. Additionally, the pins, having greater accuracy in placement, can serve as a calibration reference for the overhead optical projections within the mold.

Upon completion of the layup process, a bag can be sealed around the perimeter of the mold to create a vacuum and the resin infusion processes can conducted with the pins 160 included in the infusion area. The fitting tolerance of pins 160 and pin holes prevents the ingress of infusion resin into the pin holes.

Figure 7A:
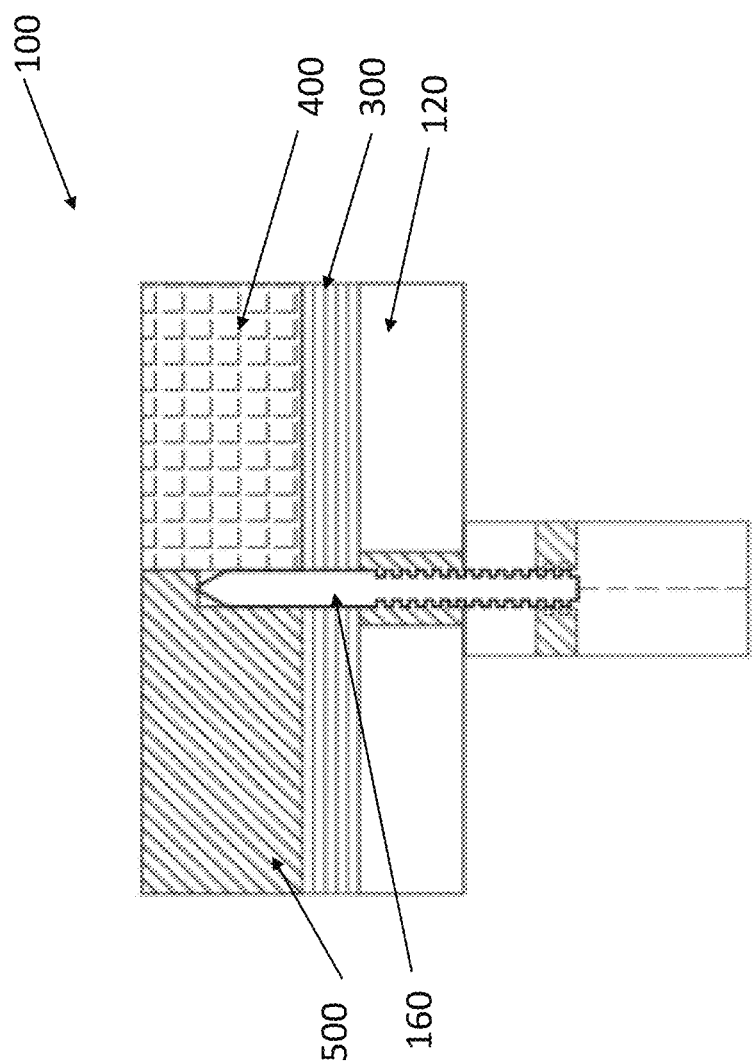
Figure 7C:
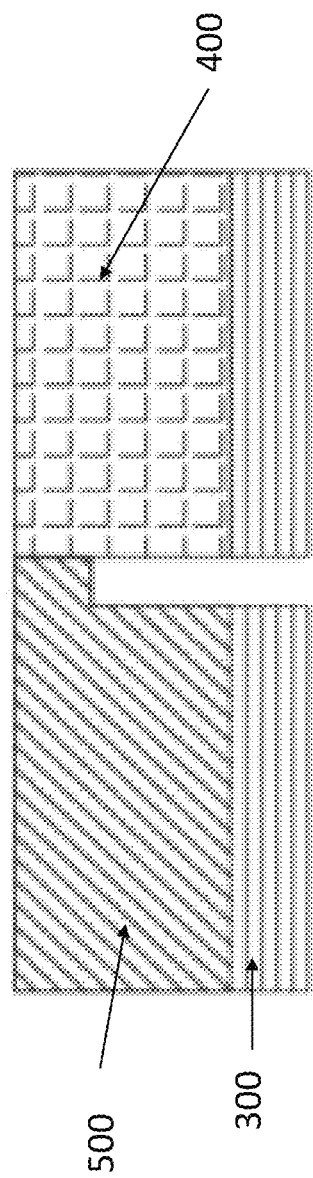

Referring to FIGS. 7A-7C, structural components that may be inserted into the mold and engage pins in one, or both, retracted and extended positions. FIGS. 7A-7C depict the structural components 400 and 500 that can be inserted into the mold and engage (e.g., abut) the pin 160 in the extended position, and the retracted position of the pin, post infusion. Referring specifically to FIG. 7A, the pin 160 in the fully extended position above the mold 120. The pin 160 can be positioned between two structural components 400, 500, with a portion of structural component 500 extending over the distal end of the pin 160. The pin 160 can remain in the extended position shown during the resin impregnation and vacuum draw to prohibit resin from entering the pin channel. After the infusion process is completed, the pin 160 can be retracted, back to its initial position, which may be internal or within the mold or external to the mold completely. The structural components 400 and 500 may be internal structural components such as spar caps, ribs or internal bracing present in the blade half and eventually, the formed blade. The structural components 400 and 500 may have corresponding geometric cavities or features configured to engage with an extended pin 160. The structural components 400 and 500 may have corresponding geometry such as holes, channels, grooves, shoulders, cavities, openings or the like. In various embodiments, a portion of the structural components 400, 500 may be configured to be pierced by pin 160 one or more times.

The lack of the pin 160 forms an empty gap or cavity 510 between the structural components 400 and 500, as shown in FIG. 7B. Gap or cavity 510 may be filled in with putty, sealant, or another substance in semi-liquid viscous or solid form. The putty may serve to fill the cavities in the formed blade or portion thereof. In various embodiments, pin 160 may be coated in putty or foam configured to fill the cavity 510 upon retraction of pin 160 from above the mold surface. In various embodiments a portion of the pin 160 may be configured to deliver foam, putty or sealant via one or more internal bores. For example and without limitation, the pin 160 may have one or more internal channels configured to deliver the sealant like a nozzle. In various embodiments, the second end of the pin 160 may be in fluid communication with a hose or tubing and a component such as a pump configured to deliver sealant through the tubing into the pin 160 and into cavity 510. The formed blade (e.g., bonded layup segments 300) and the attached structural components 400, 500 are then readily removed from the mold, as shown in FIG. 7C, (note that mold 120 is no longer present), as the cured blade has been removed from the mold in a demold process. In various embodiments, the demold process may include any portion of removing layup segments 300 and/or structural components 400, 500 from the mold 120. In various embodiments, the demold process may be manual via one or more users/technicians. In various embodiments, the demold process may be automated via one or more robotic arms or machines configured to grasp the layup segments 300, whether cured or uncured, and the structural components 400, 500. In various embodiments, the demold process may include assembly with another component, such as a corresponding blade half. In various embodiments, the demold process may include assembly of a corresponding blade half and assembly of structural components 400, 500. In accordance with an aspect of the present disclosure, the retractable nature of the pins 160, allows for rapid de-molding, or removal of the finished blade form the mold, while avoiding risk of damage or defects due to undesired engagement with a pin due to unmolding loads or motions that occur during de-molding.

It should be noted, that reference to "above", "below", "top", "bottom", etc. herein is relative and non-limiting as the structures and techniques described herein are equally applicable to spar caps formed on the suction side and pressure side of a blade.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A wind turbine blade mold comprising:
   a first mold surface;
   at least one aperture located within the first mold surface, the at least one aperture configured to receive at least one pin;
   the at least one pin having a first end and a second end defining a length extending therebetween, wherein the at least one pin is configured to pierce at least one layer of layup segment deposited on the first mold surface, the second end of the pin disposed within a pin driver, and a sensor incorporated into the first end of the pin, the sensor configured to detect when all layers of layup segments disposed on the first mold surface have been pierced;
   the pin driver disposed on a second mold surface, the pin driver configured to displace the at least one pin from a retracted position wherein the first end of the at least one pin is disposed below the first mold surface, to an extended position wherein the first end of the at least one pin is disposed above the first mold surface.

2. The mold of claim 1, wherein the pin driver displacement generates rotational movement of the at least one pin.

3. The mold of claim 1, wherein the pin driver displacement generates linear movement of the pin.

4. The mold of claim 1, wherein the pin driver is displaced via rotational movement of a driver casing.

5. The mold of claim 1, wherein the pin driver and the at least one pin are coupled via a threaded coupling.

6. The mold of claim 1, further comprising a plurality of apertures disposed about and along a span of the first mold surface.

7. The mold of claim 1, further comprising a bushing disposed within the at least one aperture, the bushing including a channel for receiving the at least one pin.

8. The mold of claim 1, further comprising a sealing gasket disposed within the at least one aperture.

9. The mold of claim 1, further comprising at least one layer of layup segments disposed on the first surface of the mold, with the second end of the at least one pin disposed above the at least one layup segment.

10. The mold of claim 1, wherein a portion of the at least one pin is configured to engage a structural component of a wind turbine blade.

11. The mold of claim 1, wherein the at least one pin includes a first portion telescopingly received within a second portion of the at least one pin, with both the first and second portion of the at least one pin configured to extend through the at least one layer of layup segment deposited on the first mold surface, the first portion having a round head and the second portion having a sharp head.

* * * * *